United States Patent [19]
Johnson et al.

[11] Patent Number: 5,630,102
[45] Date of Patent: May 13, 1997

[54] IN-CIRCUIT-EMULATION EVENT MANAGEMENT SYSTEM

[75] Inventors: Thomas M. Johnson, Tempe; Aravindh Bakthavathsalu, Chandler; Richard Brunner, Gilbert; Eliot Garbus, Scottsdale; Byron Gillespie, Phoenix; Stephen J. Strazdus, Chandler, all of Ariz.

[73] Assignee: Intel Corporation, Santa Clara, Calif.

[21] Appl. No.: 359,057

[22] Filed: Dec. 19, 1994

[51] Int. Cl.$^6$ ............................................. G06F 9/455
[52] U.S. Cl. ................................................. 395/500
[58] Field of Search ............................ 395/500, 375, 395/311, 183.1, 183.04, 800, 823, 180; 364/578

[56] References Cited

U.S. PATENT DOCUMENTS

| | | | |
|---|---|---|---|
| 5,321,828 | 6/1994 | Phillips et al. | 395/500 |
| 5,357,628 | 10/1994 | Yuen | 395/183.1 |
| 5,440,747 | 8/1995 | Kiuchi | 395/375 |
| 5,515,530 | 5/1996 | Eskandari | 395/180 |

*Primary Examiner*—Kevin J. Teska
*Assistant Examiner*—Dan Fiul
*Attorney, Agent, or Firm*—Blakely, Sokoloff, Taylor & Zafman

[57] ABSTRACT

A microprocessor system utilizing an in-circuit emulator (ICE) to aid in testing and debugging by an external emulator. The microprocessor operates in two modes. One mode is emulation mode in which the microprocessor outputs trace information for allowing the emulator to reconstruct microprocessor execution, and the other mode is interrogation mode where the microprocessor ceases emulation mode, and allows the emulator to modify the state of the microprocessor or interrogate it. An ICEBRK signal is provided on the microprocessor to better handle transition from emulation to interrogation mode. An address mark counter and generator is provided to force the microprocessor to automatically issue an address mark message which includes the location of the microprocessor's instruction pointer. An AMCTRL bit may be further provided to allow a human user to selectively inhibit the issuance of an address mark. An ICELOCK signal is provided on the microprocessor to control the writing of control registers during hardware and software initialization that the microprocessor performs. A MSGFRM signal is provided to aid the emulator in capturing trace information generated at high frequencies (in excess of 40 MHz).

12 Claims, 10 Drawing Sheets

PRIOR ART

IN-CIRCUIT-EMULATION EVENT MANAGEMENT SYSTEM

BACKGROUND OF THE INVENTION

1. Field of the Invention

The present invention relates to microcomputer systems and more specifically, toward instruments that test and debug hardware and software by emulating and controlling those microcomputer systems through a technique known as in-circuit emulation.

2. Art Background

Microprocessors require very thorough and speedy testing by external emulators before they are employed in computer systems for production and sale. Thus, in order to sharply curtail the testing time required for microprocessors, the computer industry developed a now well-known emulation technique frequently referred to as in-circuit-emulation that enhances the system test and debug process.

In-circuit-emulation is a system which includes a peripheral device referred to as an in-circuit-emulator (ICE) that is embedded within a target microprocessor system which is implicitly aware of the target microprocessor's operations and can generate real-time trace information for reconstructing processor execution in an external host emulator. An ICE system employs its own ICE bus, separate from normal data, address or control busses found on the microprocessor integrated circuit, so as not to interfere with processor behavior while the ICE system generates trace information. An ICE system also utilizes a probe tip, an external host, and a workstation where the probe tip functions as an interface between the ICE and the external host which are connected by a cable typically having an implementation dependent number of wires. The external host emulator is connected to and controlled by the workstation using any convenient parallel or serial interface. The ICE bus provides a command port interface with which the external host can interrogate and modify the state of the microprocessor or access a memory sub-system of the target microprocessor. The ICE system includes a set of debugging capabilities to facilitate and shorten the debugging process. By using an ICE system, engineers can more effectively control the external emulation of a microprocessor application during the debugging process.

However, in order to control the operation of the ICE and the microprocessor, control signals are required to provide handshaking signals between the host emulator and the target microprocessor. These handshaking signals communicate what steps the target and host should perform next in the debugging process.

Two of the ICE modes present in certain microprocessors, such as the Intel 80960 family of processors are emulation and interrogation mode. During emulation mode, the target processor executes application code normally, and outputs trace information on an 8-bit ICE bus with each core clock cycle. This trace information aids in reconstructing exact target processor operation during a given period of time. Trace information is output in 8-bit quantities known as trace messages. Since the ICE bus is physically distinct from the target microprocessor's address and data bus, trace messages are output clock-by-clock without significantly impacting processor performance. These trace messages are captured in a trace collection buffer for later processing by the external host emulator.

When the host emulator wishes to interrogate or modify the target processor's state, it must break processor execution of application code. To break execution, the host emulator must force the target processor to transition from emulation to interrogation mode. Once this is accomplished, the processor ceases to generate trace messages, and enters a state in which it is ready to receive and execute interrogation mode commands. Interrogation mode commands are received from the host emulator over the ICE bus and processed by an on-chip microcode program monitor which then assumes control of the target processor. These commands may be used to interrogate or modify processor state as well as to access target processor memory.

Several problems exist with in-circuit emulation as currently embodied in existing microprocessors such as the Intel 80960 CX. First, it is difficult to redirect the ICE bus to issue the break request command at high frequency. Second, several instructions of application code may execute after the break request command is issued, but before the processor actually transitions to interrogation mode. This leads to a problem known as breakpoint skid. Third, it is difficult to redirect the ICE bus at high frequencies to issue requests for address marks, which indicates the current location of the target processor's instruction pointer. External hardware has been traditionally required to issue address mark requests on a periodic basis. Finally, with the increasing speed of microprocessors, for instance 66 MHz with Intel 80960 HX and JX microprocessors, the microprocessors must somehow aid external logic in capturing trace messages issued at these high frequencies since current emulators are currently capable of supporting frequencies only up to around 40 MHz.

SUMMARY OF THE INVENTION

The invention provides an improved in-circuit-emulator (ICE) and facilities employing directed mechanisms such as signals, pins and control bits that can used with existing microprocessors or microcontrollers, such as the 80960 HX and JX microprocessor families available from Intel Corporation to enhance their testing and debugging.

The invention also provides an ICE facility and technique that can efficiently force the microprocessor to enter interrogation mode, avoid breakpoint skid and provide better handling of breakpoint events. The invention also eliminates external hardware used to request address marks and better allow capture of messages carried at high frequencies by microprocessors.

Specifically, an ICE break signal $\overline{\text{ICEBRK}}$, generated by asserting an $\overline{\text{ICEBRK}}$ pin provides an emulator with the ability to quickly and easily force the microprocessor to enter interrogation mode. A signal ICE lock $\overline{\text{ICELOCK}}$ generated by asserting an $\overline{\text{ICELOCK}}$ pin (i.e., applying a low logic level signal to a pin, which signal is active low) enables the processor, when placed in emulation mode, to handle reset events more efficiently and results in ICE related device configuration being protected from hardware or software reset events. An address mark counter determines when address marks are requested and issued to the ICE bus. This eliminates the need for external hardware to request an address mark over the ICE bus. This allows the ICE bus to operate as an output only bus while in emulation mode and simplifies the external hardware interface to the ICE bus. Finally, a message frame signal ($\overline{\text{MSGFRM}}$) which is generated by the target microprocessor aids external logic in capturing incremental trace messages output from the target microprocessor at high frequency. Real-time tracing is of paramount importance in embedded applications. Embedded microprocessors typically control applications such as networking equipment, aircraft navigational equipment, laser printers and the like. The microprocessor must react correctly to thousands of asynchronous events every second.

These mechanisms may be implemented independently of each other or in any combination thereof.

BRIEF DESCRIPTION OF THE DRAWINGS

The objects, features, and advantages of the present invention will become apparent to one skilled in the art from reading the detailed description which follows in which:

FIG. 1b shows a block level diagram of an ICE architecture which may be used in conjunction with a microprocessor of the type shown in FIG. 1a.

DETAILED DESCRIPTION OF THE INVENTION

The present invention provides mechanisms in the nature of signals, pins and control bits which when added to existing microcontroller or microprocessors such as the 80960 HX and JX microprocessor families available from Intel Corporation enable vendors of products which use such microprocessors to more easily test and debug their products using a technique and facility known as in-circuit emulation which includes an in-circuit emulator (ICE) in the same integrated circuit as the microprocessor. Although the following description is specified in terms of the architecture of the 80960 processor family, it should be apparent to persons skilled in the field of the invention that the techniques described herein have application to other microprocessor families which utilize an ICE system.

General Background

Two of the ICE modes present in certain microprocessors such as the Intel 80960 family of processors are emulation and interrogation mode. During emulation mode, the target microprocessor executes application code normally, and outputs trace information on an 8-bit ICE bus. Trace information is output in 8-bit quantities known as trace messages, with each rising edge of the core clock. Since the ICE bus is physically distinct from the address and data bus, trace messages are output clock-by-clock without significantly impacting processor performance.

When a host emulator wishes to interrogate or modify the target processor state, it must break processor execution of application code. To break execution, the host emulator must force the target processor to transition from emulation to interrogation mode. Once this is accomplished, the processor ceases to generate trace messages, and enters a state in which it is ready to receive and execute interrogation mode commands. Interrogation mode commands are received from the host emulator over the ICE bus. These commands may be used to interrogate and modify target processor state.

Figure 1A:
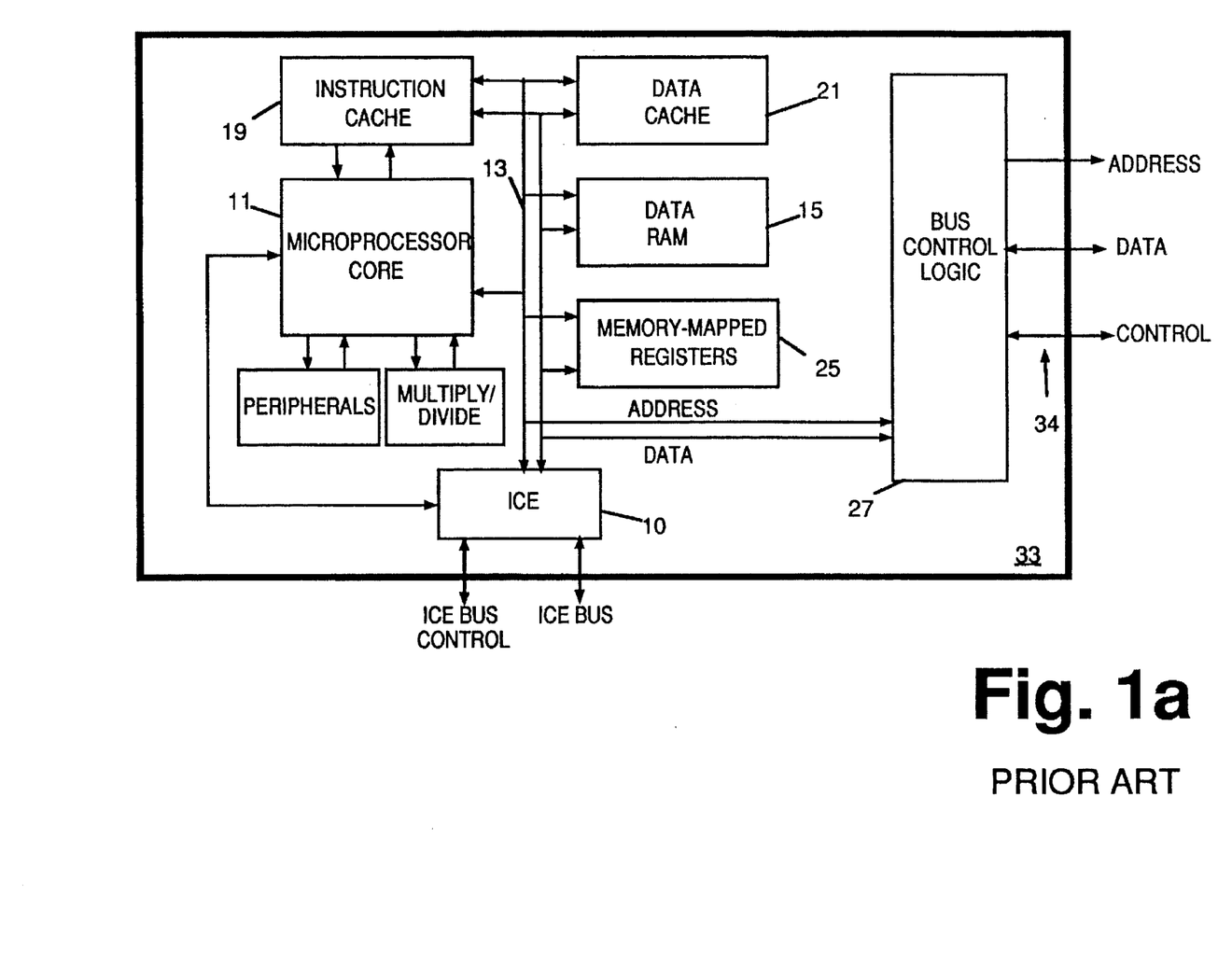
FIG. 1a shows a block level diagram of a microprocessor incorporating ICE system architecture.

FIG. 1a shows an overview of how an ICE 10 relates to the target microprocessor system architecture. The ICE 10 is coupled to the core 11 of a microprocessor such as 80960 and is coupled as well to internal bus 13, data RAM 15 as well as internal instruction cache 19 and data cache 21. Connection to the instruction cache 19 shows an important feature of an ICE which is the ability to trace commands where instructions are fetched from the instruction cache, because at such times, the external user buses all remain inactive. The operation of the target microprocessor system 33, which also includes memory mapped registers 25 and bus control logic 27, and target system bus 34, are well known and will not be discussed in detail so as not to obscure the present invention.

Figure 1B:
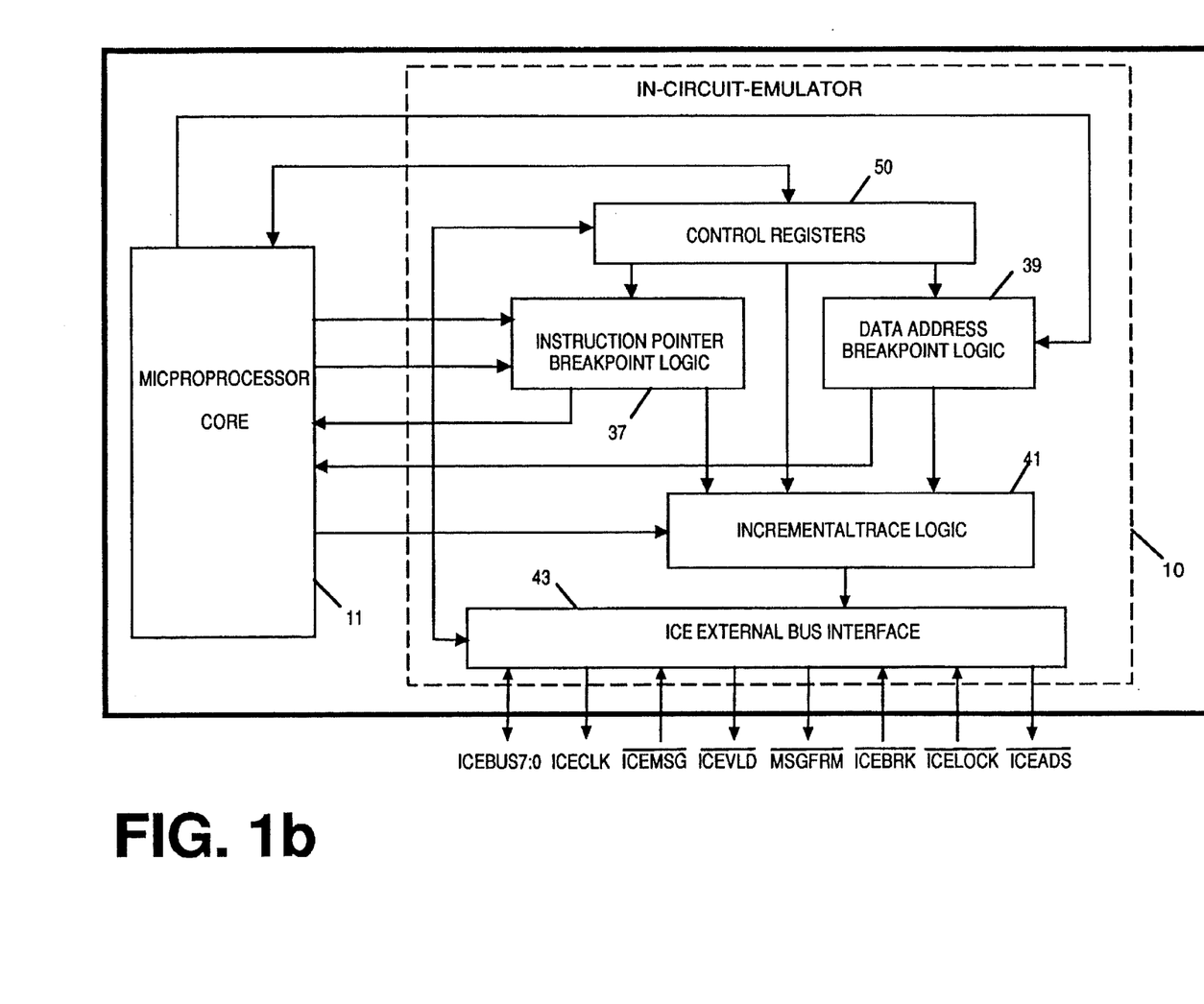

FIG. 1b shows the components of an ICE 10 used to implement the present invention. The elements are control registers 35, instruction break point logic 37, data address breakpoint logic 39, incremental trace logic 41 and ICE external bus interface 43. Most of the elements and functionality of ICE 10 are substantially the same as in a prior art ICE such as the one used for an Intel 80960 CX processor. Therefore, details concerning the manufacture and use of an ICE of the type shown in FIG. 1b will not be described herein except as necessary for a proper understanding of the enhancements to such an ICE architecture forming the present invention.

Firstly, bus interface 43 is modified to handle the signals ICE break $\overline{\text{ICEBRK}}$, ICE lock $\overline{\text{ICELOCK}}$ and message frame $\overline{\text{MSGFRM}}$. The specifics of such modifications should be readily apparent to persons skilled in the relevant art based upon the descriptions contained herein. Control registers 35 include an ICE control register ICECTL, an ICE trace controls register ICETC and breakpoint control register BPCON. Details regarding these registers and other elements of ICE 10 shown in FIG. 1b are not needed for an understanding of the invention. However, the following description of the various elements shown in FIG. 1b is provided so that the changes made to a prior art ICE needed to implement the present invention are clear.

ICEBUS

The ICE bus (ICEBUS) is a bidirectional bus which provides the main communication path between the host emulator and target processor. Valid information on this bus is qualified with the rising edge of ICECLK. During emulation mode, incremental trace messages are output on this bus with each rising edge of ICECLK. During interrogation mode, the host emulator issues commands, and receives machine state information over this bus.

ICECLK

The ICE clock (ICECLK) output serves to synchronize all ICE bus handshaking. ICECLK corresponds internally to phase 1 of the target processor's clock. The output frequency is equal to the core frequency. All ICE control outputs and the ICE bus are qualified with the rising edge of ICECLK. Likewise, ICE control inputs and the ICE bus are sampled on the rising edge of ICECLK.

ICEMSG

The ICE message ($\overline{\text{ICEMSG}}$) input is used by the host emulator during interrogation mode to indicate that data has been accepted from the target processor, and that data is ready for the processor. A low level on this pin indicates to the processor that the emulator has accepted data from the target processor. A high level indicates that the host emulator is acknowledging the end of the ICE bus cycle. This input is sampled on the rising edge of ICECLK. $\overline{\text{ICEMSG}}$ and $\overline{\text{ICEVLD}}$ (described below) form the two handshaking signals used during interrogation mode.

After driving $\overline{\text{ICEMSG}}$ high, the host emulator may drive the ICE bus with valid data during receive ICE bus cycles. During emulation mode, this pin must be driven by the host emulator to its deasserted state.

ICEVLD

The target processor drives ICE valid ($\overline{\text{ICEVLD}}$) to its inactive state during emulation mode. Upon a transition to interrogation mode, the pin is driven to its active (low) state to indicate that the processor has made the transition. The processor will not assert $\overline{\text{ICEVLD}}$ until all incremental trace messages have been issued to the ICE bus, and all queued bus cycles have been completed on the host to target processor bus. In this manner, $\overline{\text{ICEVLD}}$ acts as a signal to indicate when the emulator can cease capturing trace information. Once in interrogation mode, $\overline{\text{ICEVLD}}$ is used in conjunction with $\overline{\text{ICEVLD}}$ as a handshaking signal to indicate the processor is driving the ICE bus with valid information. The state of this pin is updated with the rising edge of ICECLK.

MSGFRM

Message frame ($\overline{\text{MSGFRM}}$) is another new signal provided by the invention which is active only during emulation mode. This output frames each trace message by going low when the first byte of each trace message is issued to the ICE bus. If multiple one-byte trace messages occur in sequence, then this pin will remain active (low) for multiple clocks. This signals assists the host emulator in processing trace messages at high frequency.

During interrogation mode this pin remains in its inactive (high) state. The $\overline{\text{MSGFRM}}$ pin is deasserted whenever a break event message is driven on the ICE bus. Upon transition from interrogation to emulation mode, this pin is asserted when the first trace message is issued to the ICE bus. This acts as a definitive signal to the host emulator that emulation mode has resumed.

ICEBRK

The ICE break ($\overline{\text{ICEBRK}}$) input is another signal provided by the invention to provide a synchronous (low level) input, to transition the target processor from emulation to interrogation mode.

After the host emulator drives the $\overline{\text{ICEBRK}}$ pin, the target processor will cease executing instructions as quickly as possible. This minimizes breakpoint skid, by reducing the number of instructions that can execute after the $\overline{\text{ICEBRK}}$ pin has been asserted. However, the processor will continue to process any instructions which may have already begun execution. Interrogation mode is not entered until all target processor activity has ceased in an orderly fashion.

ICELOCK

The ICE lock ($\overline{\text{ICELOCK}}$) pin and corresponding signal is another signal provided by the invention which is sampled during a positive (low to high) transition of the $\overline{\text{RESET}}$ pin. If deasserted, the configuration of the ICE related resources may be modified by the reset sequence. If asserted, all ICE related resources remain unmodified through a reset sequence (hardware or software). Spurious reset events can cause the processor to lose its ICE related configuration. This causes a break-down in communications between the target processor and the host emulator. To eliminate this problem, the $\overline{\text{ICELOCK}}$ pin is provided. When a hardware reset is initiated, the state of this pin is detected. If asserted, no ICE related resource are modified. This includes the ICECTL, BPCON, ICETC control registers (described below), and any hardware breakpoint resources implemented on the target processor.

If the $\overline{\text{ICELOCK}}$ pin is asserted, no attempt will be made to read an initialization mode from the ICE bus. The ICE bus will be driven with FFH during the time that reset microcode is executing. The host emulator must not drive the ICE bus if $\overline{\text{ICELOCK}}$ is asserted, and a reset or reinitialization event is detected. Doing so will cause contention on the ICE bus.

A software initiated reset can modify the settings of the hardware breakpoint registers, but only if $\overline{\text{ICELOCK}}$ is not asserted. A software reset does not modify any ICE control registers described above. If the SFTRST bit of ICECTL is set, the processor will break to interrogation mode after completion of the reset sequence, before application code begins execution. A software break event message will be issued on the ICE bus, indicating the nature of the event to the host emulator.

The host emulator may assert the $\overline{\text{ICELOCK}}$ pin indefinitely. If asserted during a hardware reset or software reinitialization event, no attempt will be made to read an initialization mode from the ICE bus. The ICE bus will be driven to an undefined state during the time that reset microcode is executing. The first valid trace message to appear on the ICE bus will be signaled by the assertion of the $\overline{\text{MSGFRM}}$ pin.

ICEADS

For implementations which include external ICE microcode, this pin must be provided, but will not be present otherwise. ICEADS is used to uniquely qualify accesses to external ICE microcode.

CONTROL REGISTERS

The control registers 50 include: ICE control register (ICECTL), ICE trace controls (ICETC), and Breakpoint Control (BPCON). ICECTL is the main control register for the on-chip ICE resources. ICETC controls ICE trace modes, such as single-stepping. BPCON controls the operation of data address breakpoints. Together these registers control global operation of the ICE resources of the device. The ICECTL and ICETC control registers cannot be modified by application code.

The ICE configuration registers may be programmed by entering interrogation mode, and issuing the appropriate interrogation mode commands. The host emulator may also take advantage of initialization sequences to modify the configuration of ICE resources.

When the target processor undergoes hardware reset with ICELOCK deasserted, the ICECTL register is initialized so that hardware breakpoint resources are locked from use by application code. When emulation initialization mode is utilized, the ICECTL register is initialized so that trace message output is enabled on the ICE bus. Clearing ICECTL disables all ICE functionality. When reset occurs with ICELOCK asserted, the state of the ICECTL register remains unchanged.

When the target processor transitions to interrogation mode, microcode disables trace and event messages, and all breakpoint capability. Globally disabling breakpoints in this manner prevents recursive entries into interrogation mode.

The ICECTL control register includes a SFTRST bit which controls entry into interrogation mode, upon execution of a software reset. If this bit is set, interrogation mode will be entered upon completion of the software reset sequence. The break to interrogation mode will occur after the processor has reinitialized, but before the first instruction of application code has executed. If this bit is clear, application code will begin execution at the new starting instruction pointer normally.

EMULATION MODE

During emulation mode, incremental trace messages are output on the ICE bus to report the activity of the processor as it executes application code. Each byte of each trace message is output on the ICE bus, synchronous with the rising edge of ICECLK. During emulation mode, there is always a valid trace message (or component thereof) output on the ICE bus during each clock cycle. Trace messages contain information about what types of instructions have executed, words of instruction executed, triggering of breakpoints, interrupts, and the like. These messages are captured in the host emulator's trace collection buffer, where they are post-processed to reconstruct the events of the processor during the run.

The ICE bus operates as an output-only bus during emulation mode.

EMULATION MODE ICE BUS PROTOCOL

Figure 10:
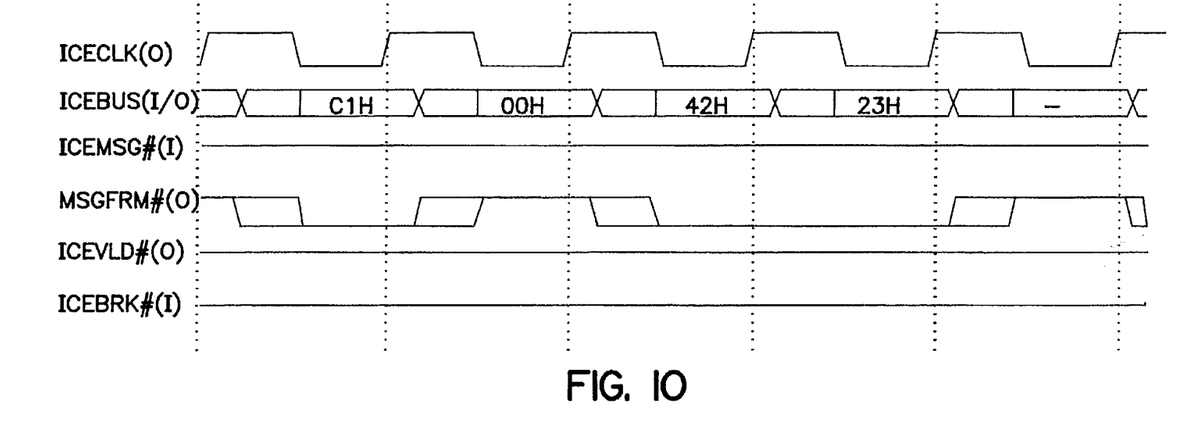
FIG. 10 shows a timing diagram illustrating the operation of the $\overline{\text{MSGFRM}}$ pin during emulation mode.

During emulation mode incremental trace messages are output on the ICE bus with each rising edge of ICECLK, as shown in FIG. 10. Incremental trace messages begin with an action byte, which indicates the trace message type. Action bytes may be followed by information bytes, depending on the trace message.

While in emulation mode, all communications between the target processor and host emulator originate from the target processor. The target processor is simply driving trace messages on the ICE bus, and the emulator is capturing them, clock by clock. Therefore, during emulation mode, ICEVLD, and ICEMSG remain in their inactive states. The processor drives the ICEVLD pin to its inactive state. The emulator likewise holds ICEMSG in its deasserted state.

The Message Frame (MSGFRM) signal frames trace messages output on the ICE bus. The signal goes low in the same clock cycle that the first byte of a trace message is issued to the ICE bus. If multiple single-byte trace messages are issued to the ICE bus, this pin remains driven low for multiple clock cycles. FIG. 10 shows the pin driven low for two clock periods, because an action byte occurred without any information bytes (hence, a single-byte trace message). The MSGFRM pin assists external logic in processing trace messages at high frequency.

Figure 2:
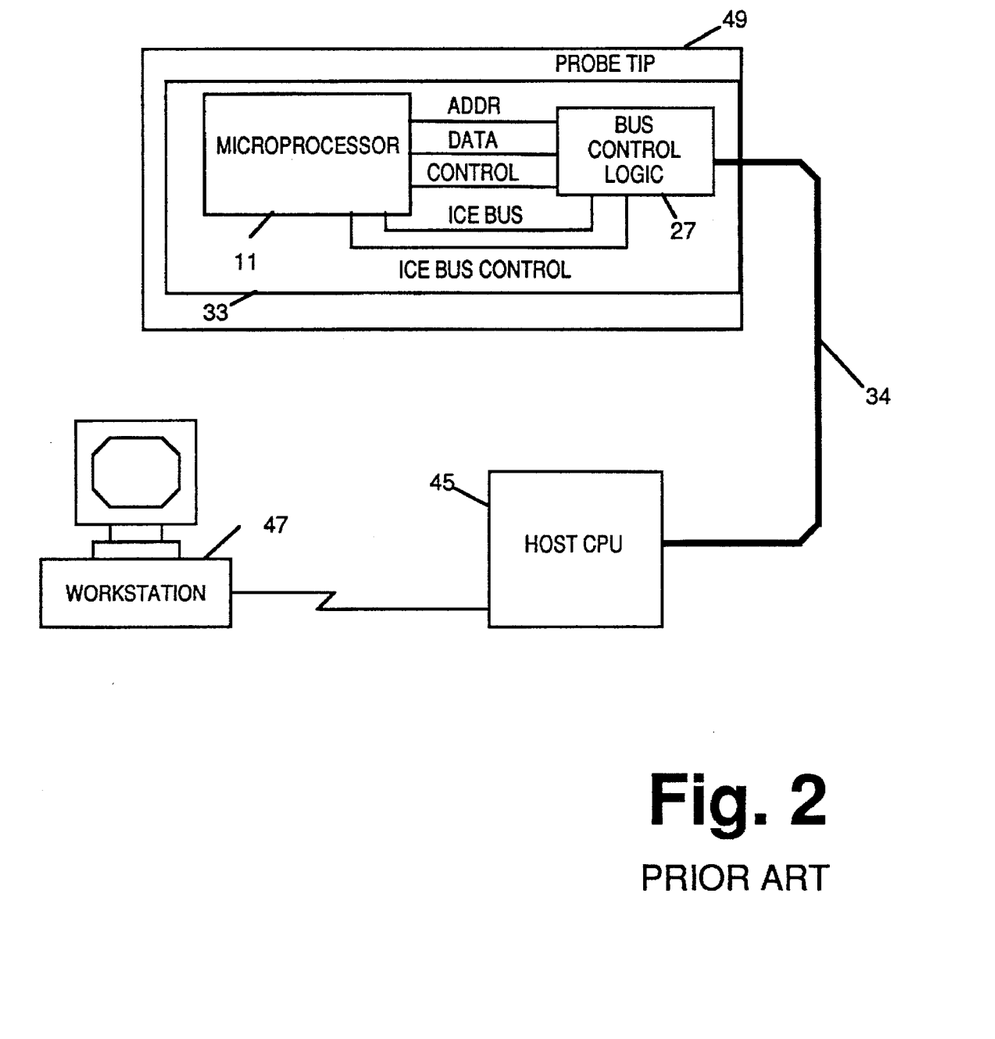
FIG. 2 shows typical emulation tool architecture (prior art).

FIG. 2 shows how an emulator host 45 interacts with the target system 33 which incorporates the microprocessor and ICE. A workstation 47, allows an engineer to interface and control the emulator host 31. A probe tip 49 contains logic necessary for the host emulator to interface with the target system 33. The host emulator contains all other elements which do not fit on the probe tip, such as a trace collection buffer and overlay memory, and acts as a controller. The operation of the probe tip and the other elements of the emulation system are well known and will not be discussed in detail so as not to obscure the present invention.

Addition of an ICEBRK Pin

An ICEBRK pin and its associated signal are provided to enable the ICE system to quickly and easily force the processor to enter interrogation mode.

1. Operation of the Processor Without ICEBRK

Figure 3:
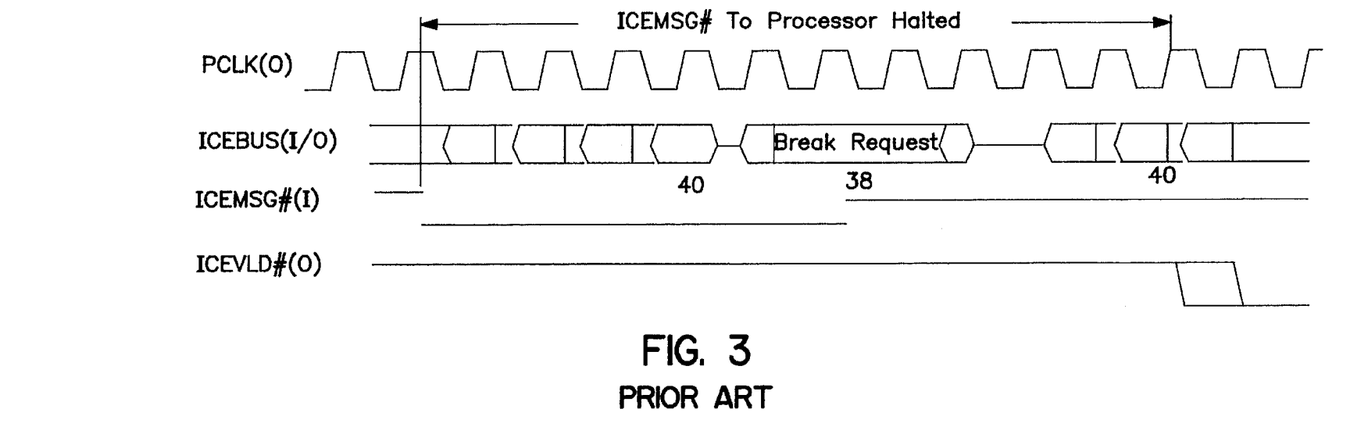
FIG. 3 shows a timing diagram illustrating the transition from emulation mode to interrogation mode under conventional operation (prior art).

Referring to FIG. 3, a transition to interrogation mode on a target processor, in the prior art, requires the host emulator to issue an emulation mode command, shown as a break request 38 over the ICE bus. To issue the break request 38, first, a pin known as the ICE message (ICEMSG) pin is asserted which causes processor execution to temporarily halt (stalls the core) and forces the ICE bus to its high impedance state. Second, the host emulator must place a break request command (01H for the 80960 processor) on the ICE bus and deassert ICEMSG. Deasserting the ICEMSG pin signals the target processor to read the break request command present on the ICE bus.

The target processor will not necessarily break to interrogation mode immediately. After receiving the break request command, the target processor resumes normal operation long enough to process the break request 38, and finish outputting any trace messages 40 that were in progress when the break request was received. During this time, additional instructions of application code are executed. This protocol of a transition to interrogation mode is shown in FIG. 3.

This protocol poses two major problems for emulator vendors. First, it is difficult to redirect the ICE bus to issue the break request command at high frequency. This difficulty arises from the fact that the target processor does not relinquish control of the bus in a deterministic manner. Second, several instructions of application code may execute after the break request command is issued, but before the target processor actually transitions to interrogation mode. This leads to a problem known as breakpoint skid.

Breakpoint skid occurs when the processor executes instructions beyond the location of the breakpoint of interest as shown in FIG. 3. From the time ICEMSG is asserted to when the target processor is temporarily halted and ready to receive emulation mode commands (signified by the ICE bus being driven to a high-impedance state), instructions are executed. Additionally, from the time the processor resumes driving the ICE bus with trace messages 40 (after ICEMSG is deasserted) to when an ICE valid (ICEVLD) signal is asserted (signifying the transition to interrogation mode is complete), instructions beyond the location of the breakpoint may also execute. So from the time the host emulator asserts ICEMSG until target processor execution actually halts and interrogation mode commences, several application instructions may execute.

2. Operation of the ICE With An ICEBRK Pin

Providing an ICEBRK pin addresses the two problems outlined above: the need to process the break request and breakpoint skid.

After the emulator host causes the ICEBRK pin to be asserted, the target processor ceases executing new instructions as quickly as possible. This minimizes breakpoint skid by reducing the number of instructions that can execute after the ICEBRK pin has been asserted.

Since ICEBRK is a separate pin, it is no longer necessary to issue a break request over the ICE bus during emulation mode, to halt the processor. This eliminates the need to redirect the ICE bus at a frequency such as 33 MHz which processors such as the Intel 80960 CX family of processors operate at, or more drastically, at the 66 MHz that processors such as the Intel 80960 HX and JX families operate at.

Figure 4:
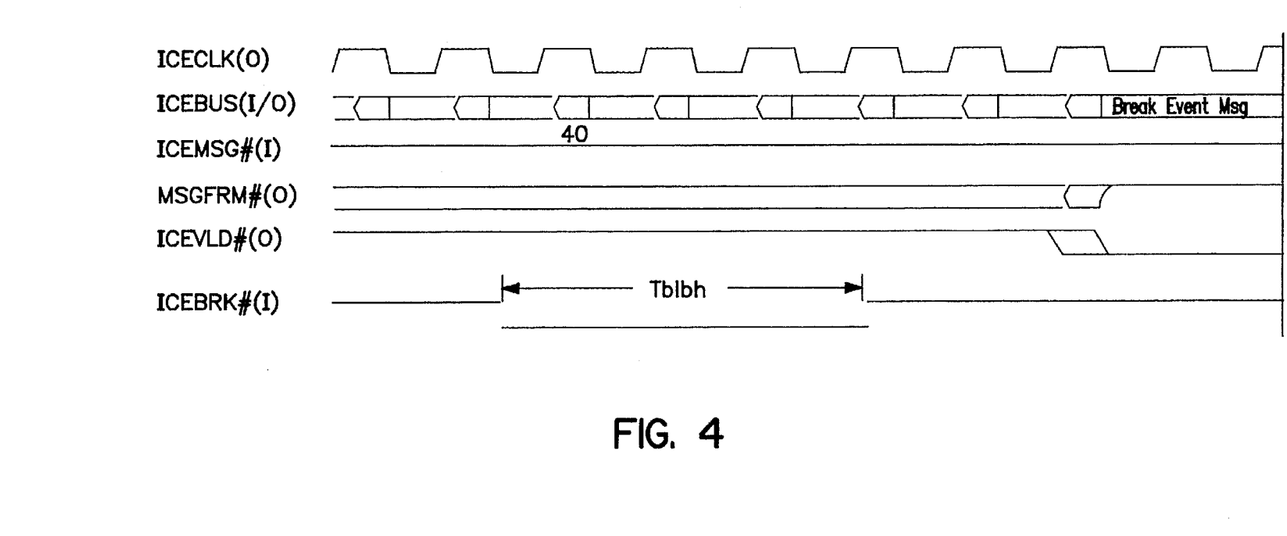
FIG. 4 shows a timing diagram illustrating the transition from emulation mode to interrogation mode using the $\overline{\text{ICEBRK}}$ signal provided by the present invention.

The protocol using the ICEBRK pin to transition to interrogation mode is shown in FIG. 4.

To break the processor to interrogation mode, the emulator host must simply assert ICEBRK by placing an active low signal on the ICEBRK pin for the minimum required period (Tblbh[min]) which is determined by processor response characteristics. Specifically, in normal mode, the host emulator need only meet setup/hold timings, and in halt mode, due to gate delays, ICEBRK is asserted for at a processor dependent number of core clock cycles, typically five. Once all pending instructions from trace messages 40, as shown in FIG. 4, have been executed, the target processor will cease executing new instructions. Thus, although asserting ICEBRK does not result in an immediate entry to interrogation mode, the delay is insignificant for all practical purposes. This is to be contrasted with breaking the processor to interrogation mode without ICEBRK in which case the processor will continue executing instructions which could take several core clock cycles. On superscalar cores, this is a significant number of instructions where even one clock cycle is too many. Depending on external activities, such as a pending bus cycle, the processor may not actually transition to interrogation mode immediately. However, while external events are being completed, no new instructions will be executed. ICEVLD is asserted, as shown in FIG. 4, when the ICE bus is available for the break event message indicating that the transition to interrogation mode is complete.

The functionality provided by the ICEBRK pin plays a key role in allowing the ICE bus to function as an output only bus during emulation mode. This greatly simplifies emulator hardware requirements.

Addition of an ICELOCK Pin

Figure 5A:
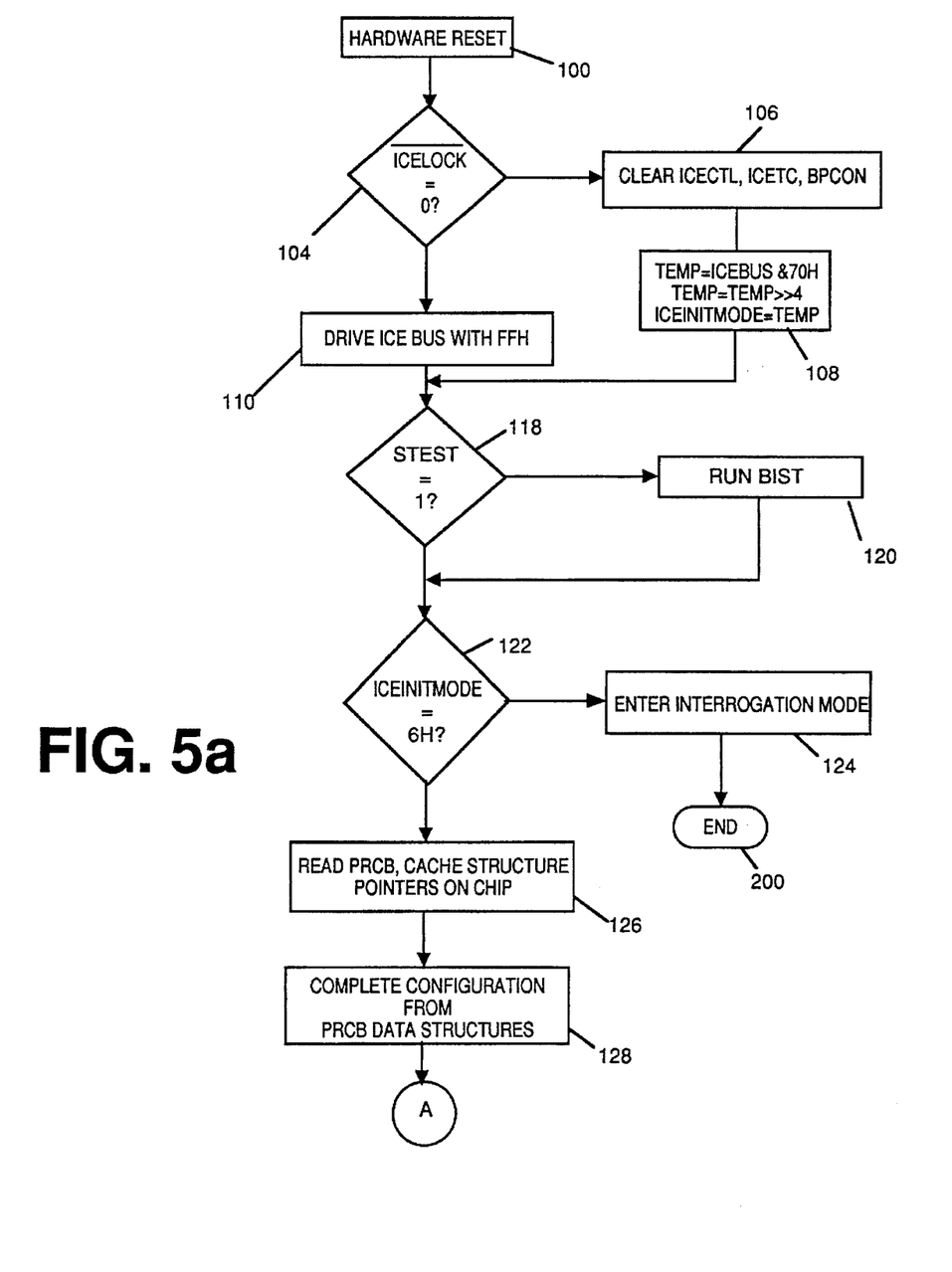
FIG. 5a and 5b show a flowchart describing the hardware initialization sequence using the $\overline{\text{ICELOCK}}$ signal provided by the present invention.
Figure 5B:
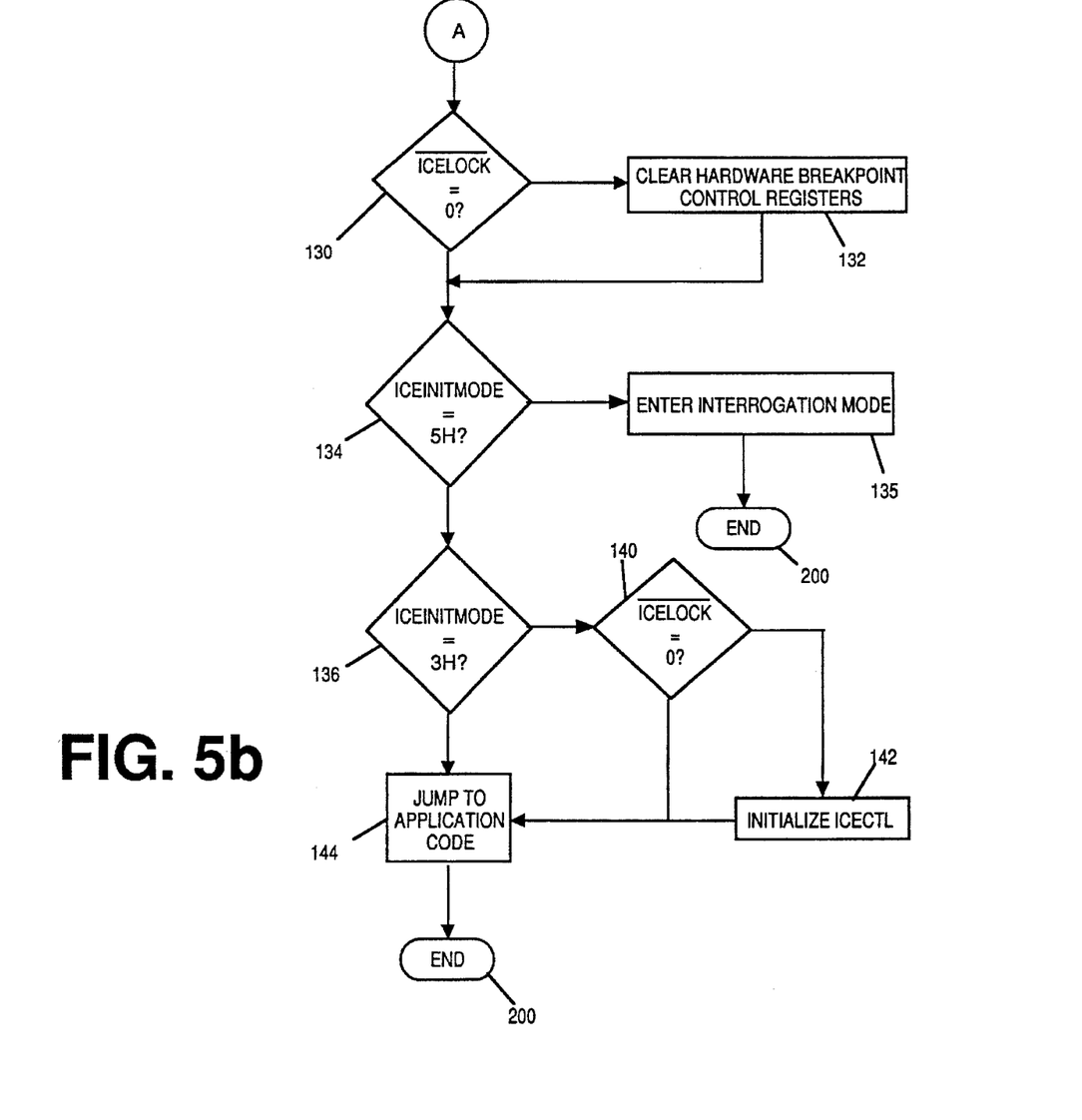

An ICE lock signal ICELOCK is provided so that when the processor is placed into emulation mode, reset events are handled more efficiently and ICE related device configuration is protected from hardware and software reset events. The sequences for (1) hardware initialization and (2) software initialization are described below, referring to FIGS. 5 and 6, respectively.

1. Hardware Initialization Sequence (FIG. 5)

FIG. 5a shows the control flow of hardware initialization with the addition of the ICELOCK pin. At the beginning of the hardware initialization sequence of the target microprocessor after a hardware reset 100, the target processor checks the state of the ICELOCK pin in block 104. If ICELOCK is deasserted (ICELOCK=1), the ICE-related control registers (ICECTL, ICETC, BPCON) are cleared (written to zero) in block 106 and a variable ICEInitMode used to control the mode the target processor enters after the reset sequence is completed is configured in block 108. If ICELOCK is asserted (ICELOCK≠1), these registers retain their current state and the ICE bus is driven to all 1's (FFH in block 110).

The target processor then configures itself as in the prior art (blocks 118–128). Referring then to block 130, hardware breakpoint registers are initialized to 0 (i.e., 00000000H) (Block 132) if ICELOCK is deasserted (ICELOCK=1). However, if the ICELOCK pin is asserted (ICELOCK≠1), these registers retain their state as do the control registers.

The Intel 80960 microprocessor families support several initialization modes which may be initiated during a hardware reset sequence. The ICEInitMode variable, which is read from the ICE bus during hardware reset, controls which mode the target processor enters. For example, referring to FIG. 5b, after configuration of the hardware breakpoint registers has been completed, if the ICEInitMode variable holds a value of 5H (block 134), the target processor enters interrogation mode (block 135). Another of these modes, Emulation Initialization mode, is useful for automatically configuring the processor for emulation mode. Emulation Initialization mode may be entered when ICEInitMode=3H (block 136), as seen in FIG. 5b. This mode is not the same as emulation mode, where trace information is output on the ICE bus with each clock and can be used to reconstruct the processor execution flow. Emulation Initialization mode, in contrast, causes the ICECTL register to be initialized to an appropriate value to enable emulation mode (if ICELOCK=1, as shown in block 140). However, if the ICELOCK pin is asserted (ICELOCK≠1), this register is protected from modification as the sequence skips initializing the ICECTL register and jumps straight to application code, block 144.

Using the ICELOCK mechanism, the host emulator can allow the hardware reset sequence to progress normally, configure the ICE resources of the target processor, and then assert ICELOCK to protect the ICE configuration from future hardware reset events. The ICELOCK pin can be asserted (held at a low, non-one state) by the emulator host indefinitely.

2. Software Initialization Sequence (FIG. 6)

Figure 6:
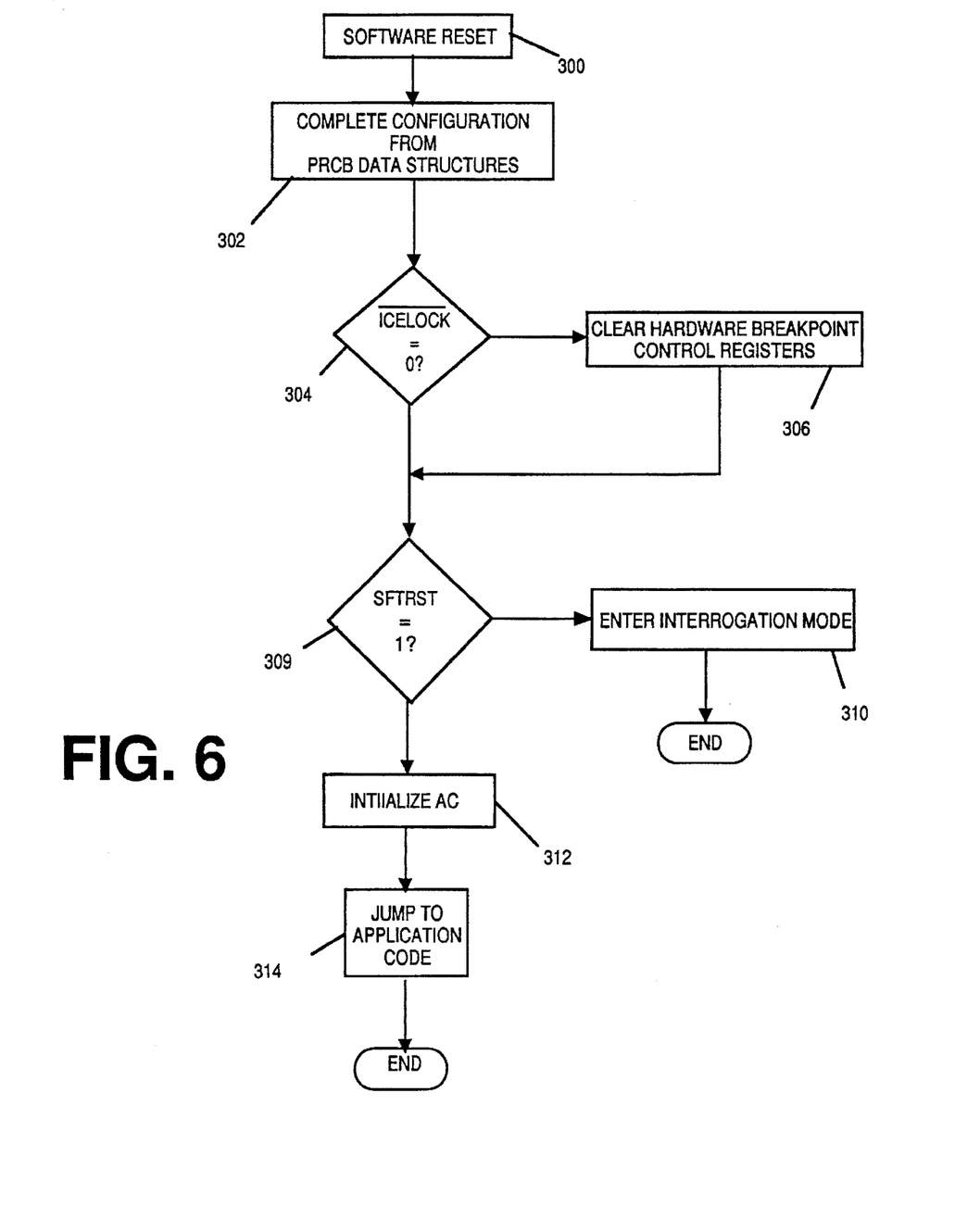
FIG. 6 shows a flowchart describing the software initialization sequence using the $\overline{\text{ICELOCK}}$ signal provided by the present invention.

The software initialization sequence is shown in FIG. 6. During software initialization, the processor, as in hardware initialization sequence blocks 102 to 138, completes other configuration requirements (block 302) and then checks the state of the ICELOCK pin to determine how to treat the hardware breakpoint registers (block 304). If ICELOCK is asserted, the hardware breakpoint registers remain unmodified. Otherwise, the hardware breakpoint registers are cleared (block 306).

After a software reset (block 300), configuration of the system is completed except for hardware breakpoint registers (block 302). If ICELOCK is not asserted (block 304), the hardware breakpoint registers are cleared (block 306), otherwise they are passed unchanged and in block 308. The state of a software reset (SFTRST) bit is also checked in block 309. If this bit is set, then processor execution will halt, and the target processor will wait for the emulator host to issue a command over the ICE bus (i.e. enter interrogation mode, block 310). If the SFTRST bit is clear, the target processor initializes application code in block 312 and jumps to application code (block 314). The SFTRST control bit provides the host emulator with a finer control over processor behavior during software reset events.

Addition of the ICELOCK pin and the use of the SFTRST control bit guarantees that the emulator may protect the ICE-related configuration of the target processor from modification during reset events. These features enable robust and efficient emulators, and simplifies the interface between the target processor and emulator host.

Automatic Address Mark Generator and Counter

An automatic address mark generator and counter are provided for microprocessors having an in-circuit-emulation implementation such as the 80960 HX and JX which causes the automatic issuance of address mark trace messages.

1. Background

Figure 7:
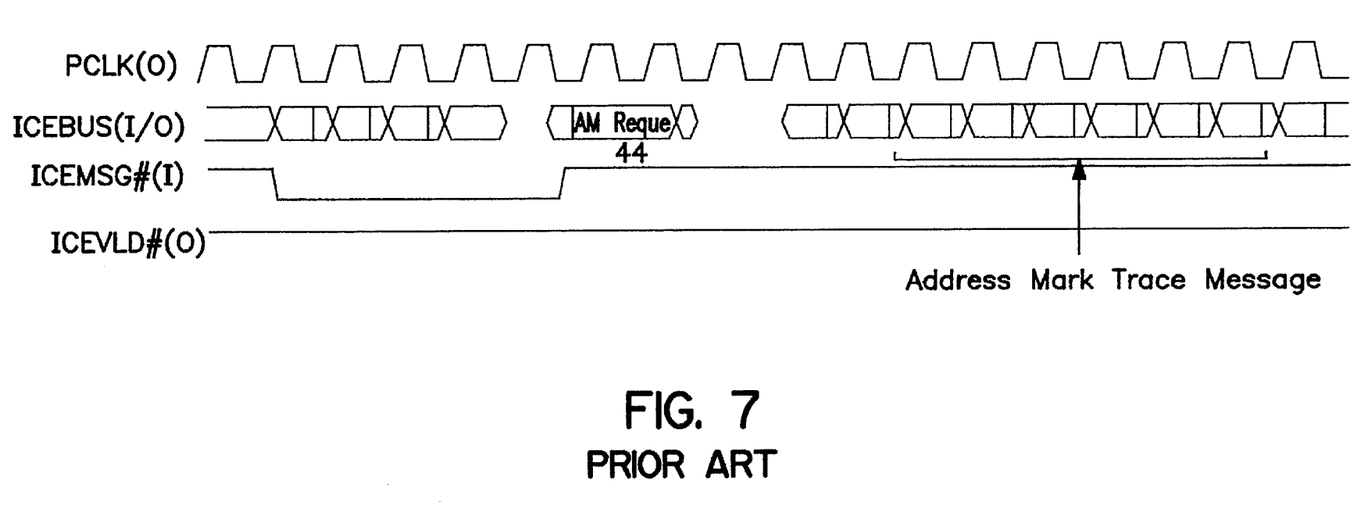
FIG. 7 shows a timing diagram for the protocol for an address mark request under conventional operation (prior art).

Incremental trace messages, outputted on the ICE bus by the target processor while in emulation mode, include information such as the number of words of execution, as well as the occurrence of a break in linear program execution flow (due to a call or branch). Several of the trace messages also include information known as an address mark, which indicates the current location of the target processor's internal instruction pointer (IP). There is also one trace message, referred to as the address mark trace message, whose sole purpose is to provide the current IP address. This trace message is five bytes long for the 80960 processor and is explicitly requested by the emulator host for some microprocessors (the Intel 80960 CX) as shown in FIG. 7. The first byte indicates that an address mark will follow, which, the Intel 80960 CX, is followed by four bytes (LSB first) of the current IP address. The emulator host captures the trace messages output on the ICE bus, and uses this information to reconstruct processor execution.

The emulator host traces all of the pins of the target processor (not just the ICE bus), on a clock-by-clock basis, and stores the state of each pin in a trace collection buffer. Due to cost and space constraints, it is expedient to minimize the size of the trace collection buffer. However, to accurately reconstruct processor execution, the trace collection buffer must contain at least one address mark to use as a reference point for the other trace messages.

Address marks are not issued when the processor executes RISC branch instructions. Therefore, if the processor enters a small loop with many iterations, it may be thousands of clock cycles before an address mark is issued on the ICE bus. In this case, the trace collection buffer could fill up with trace messages, none of which contain an address mark, making trace reconstruction impossible. To guarantee that an address mark is always present in the trace collection buffer, the emulator must periodically request the processor to issue an address mark on the ICE bus.

Referring to FIG. 7, requesting an address mark is accomplished by issuing the Address Mark Request command 44 over the ICE bus during emulation mode. To issue this command the host emulator must first get control of the ICE bus, since the processor is using this bus to output trace messages. To get control of the ICE bus, the host emulator asserts the $\overline{\text{ICEMSG}}$ pin. This temporarily halts the processor, and forces the ICE bus to its high-impedance state. The emulator may then drive the bus with the Address Mark Request command. This is shown in FIG. 7, showing the ordinary protocol for an Address Mark Request on the 80960 CX Processor.

While this method is effective, it requires redirecting the ICE bus, while operating at high frequency, to issue the address mark request. This is difficult because the target processor does not relinquish control of the bus in a deterministic manner. Additionally, processor activity is temporarily suspended while the request is issued.

2. Operation of the Automatic Address Mark Counter/Generator

The automatic address mark counter provides a mechanism which causes the processor to periodically generate an address mark trace message, without the need for an explicit request from the emulator. This eliminates the need for the emulator to redirect the ICE bus at a high frequency, such as 66 MHz as with the Intel 80960 HX and JX processor families, to issue the request.

Figure 8:
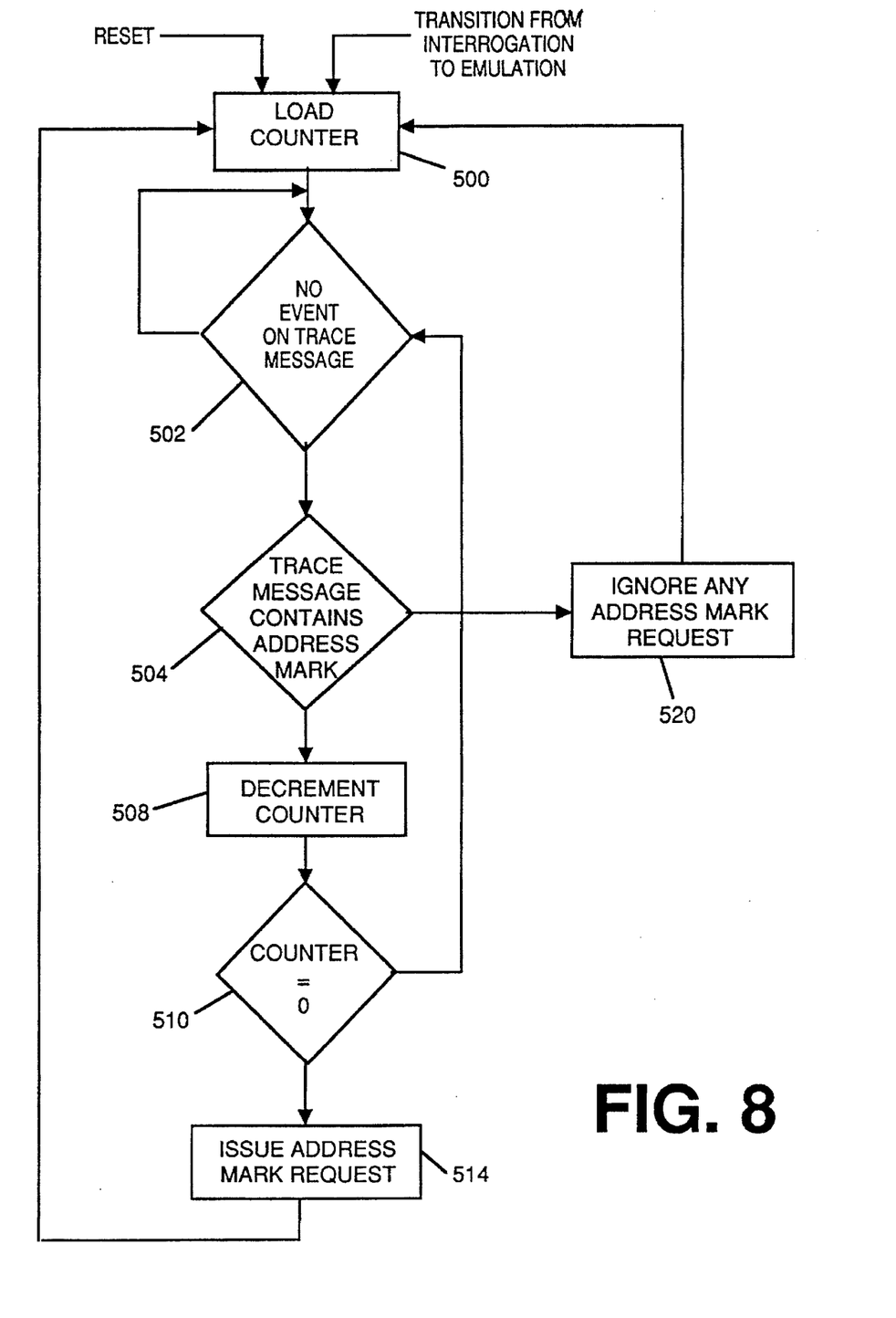
FIG. 8 shows a flowchart describing the operation of the address mark counter and generator.

The automatic address mark counter as implemented on the 80960 HX and JX processors is an 8-bit counter, typically as part of incremental trace logic as shown in FIG. 1b. FIG. 8 shows the logic flow of how the address mark counter and generator operates. Referring to block 500, the counter is initialized to 00H whenever a software or hardware reset occurs, or whenever emulation mode resumes (transition from interrogation to emulation mode). During any clock cycle, as shown in block 502, the logic holds the counter in its previous state while a "No Event" trace message is issued. Additionally, as long as no trace message contains an address mark (block 504), the counter is decremented by one on the rising edge of ICECLK (block 508) and compared to 00H with each clock cycle (block 510). Upon reaching the terminal count (00H), an address mark request is issued by incremental trace logic (block 514), and the counter is once again initialized to 00H (back to block 500). The cycle then repeats indefinitely.

The address mark counter and generator is flexible in that automatically generated address mark trace messages may be inhibited by merely clearing an AMCTRL bit located in the ICECTL register. By clearing (set to zero) this bit, the automatic address mark counter is inhibited from requesting an Address Mark trace message. This provides emulator vendors with additional control granularity. They can offer their customers the option of accurate trace reconstruction at the cost of some intrusion (due to the address marks being issued to the ICE bus, and potentially stalling the core); or, very low intrusion at the cost of accurate trace reconstruction.

The address mark counter and generator eliminates redundancy in address mark requests in that any trace message that outputs an address mark as part of its normal format (blocks 504 and 506) (such as call or return trace messages) will also cause the automatic address mark counter to be reinitialized to 00H (block 500). Thus, redundant address marks are not issued to the ICE bus, unnecessarily consuming ICE bus bandwidth. In like manner, the automatic address mark counter retains its state (is not incremented) during clock cycles in which a No Event trace message is issued to the ICE bus (block 502). This also prevents unnecessary address marks from being issued to the ICE bus.

It is possible that a trace message which normally contains an address mark will be issued during the same clock that the automatic address mark counter issues an address mark request (block 514). This condition is tested for (block 504) and then the request from the automatic address mark counter is ignored (block 520), and the counter is reinitialized to 00H (block 500).

The addition of the address mark counter and generator eliminates the need for external hardware to request an address mark over the ICE bus. This feature plays a key role in allowing the ICE bus to operate as an output-only bus during emulation mode. The handshaking shown in FIG. 7 is thereby completely eliminated. This greatly simplifies the external hardware interface to the ICE bus. Additionally, intrusion on the normal operation of the processor is reduced because the processor does not have to be halted to receive the request. The reduced intrusion allows emulator vendors to more accurately emulate real-time applications.

Addition of $\overline{\text{MSGFRM}}$ Pin To Capture Incremental Trace Messages At High Frequency Addition of a $\overline{\text{MSGFRM}}$ signal to a target microprocessor aids external logic in capturing incremental trace messages output from the device at high frequency.

1. Background

One ICE mode present in the Intel family of 80960 processors is emulation mode. During emulation mode, the target processor executes application code normally, and outputs trace information on an 8-bit ICE bus. Traditionally, trace information is output in 8-bit quantities known as incremental trace messages, with each rising edge of the processor clock (PCLK). Since the ICE bus is physically distinct from the address and data bus of the target processor, trace messages are output clock-by-clock without significantly impacting processor performance. When these messages are captured by an emulation tool, they can be post-processed to reconstruct processor activity. This is illustrated in FIG. 9 showing incremental trace message output on the 80960 CX microprocessor.

Figure 9:
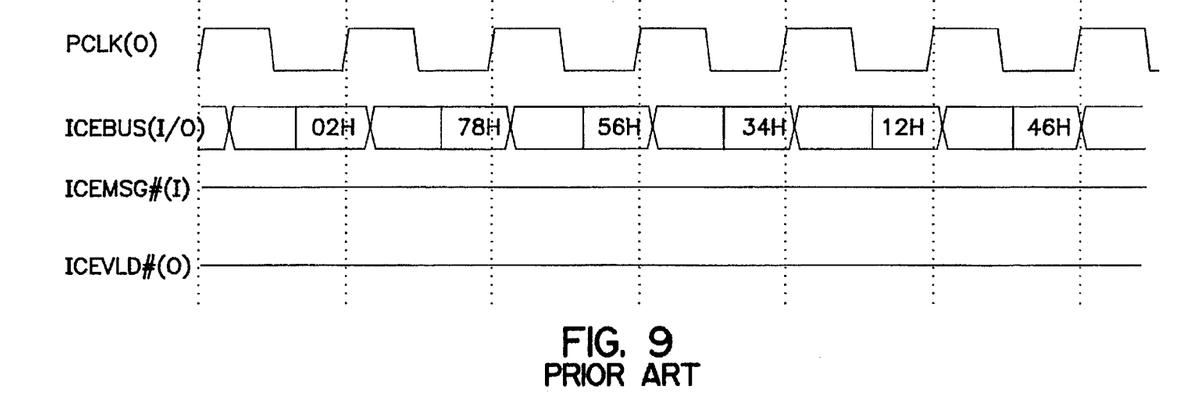
FIG. 9 shows a timing diagram illustrating incremental trace message output on a microprocessor (prior art).

In the message shown in FIG. 9, the value 02H indicates that a call instruction was executed. The following four bytes indicate the target address of the call; in this case, 1234 5678H. The value 46H indicates that processing continued with no break in linear execution flow.

The maximum frequency available for the 80960 CX family is 33 MHz. Currently, emulator vendors can support processor speeds up to about 40 MHz. However, processors such as in the Intel 80960 HX and JX microprocessor families implement high-speed cores, which operate at frequencies up to 66 MHz. Because trace messages reflect the real-time execution of the processor, they must be output at the core frequency. Capturing trace messages at core frequency (66 MHz) represents a significant design challenge for emulator vendors. To ease this interface problem, the $\overline{\text{MSGFRM}}$ pin is provided.

2. Operation of the $\overline{\text{MSGFRM}}$ Pin

The $\overline{\text{MSGFRM}}$ pin is active only during emulation mode and its operation is shown in FIG. 10. Referring to FIG. 10, this pin frames each trace message by going low when the first byte of each trace message is issued to the ICE bus. If multiple single-byte trace messages occur in sequence, then this pin will remain active (low) for multiple clocks. This signal assists external capture hardware in processing trace messages at high frequency.

Emulator vendors often filter trace messages to minimize the amount of trace collection memory required to store these messages, or to store only information of interest to the user during a particular emulation session. The $\overline{\text{MSGFRM}}$ pin significantly eases the host emulator's ability to perform this filtering function, by providing a definitive indication of the beginning of each trace message. This minimizes external logic complexity, which would otherwise have to determine for itself when a trace message begins and ends.

Addition of the $\overline{\text{MSGFRM}}$ pin simplifies the host emulator-to-processor interface, and enhances the ability of emulator vendors to provide tools which support the high-frequency members of the 80960 microprocessor family.

Although the present invention has been described with regard to certain preferred embodiments, those skilled in the art will recognize that several different variations of the invention are possible.

We claim:

1. A microprocessor with an in-circuit-emulator having an interrogation mode and an emulation mode, wherein said microprocessor outputs a plurality of trace messages over an in-circuit emulator bus, said in-circuit-emulator comprising:

an $\overline{\text{ICEBRK}}$ pin, which when asserted for a predetermined minimum period of time, causes the microprocessor to immediately cease executing new instructions when the microprocessor transitions from said emulation mode to said interrogation mode.

2. A microprocessor with an in-circuit-emulator having an interrogation mode and an emulation mode, wherein said microprocessor outputs a plurality of trace messages over an in-circuit emulator bus, said in-circuit-emulator supporting a plurality of initialization modes and a plurality of control registers, said in-circuit-emulator comprising:

an $\overline{\text{ICELOCK}}$ pin, which when asserted during said initialization mode, clears a first set of control registers in said in-circuit-emulator during initialization, wherein said $\overline{\text{ICELOCK}}$ pin when asserted also protects from being overwritten a second set of control registers when the in-circuit-emulator is engaged in said initialization mode, whereby the processor is configured for operation in said emulation mode.

3. The microprocessor defined by claim 2 where said initialization is a software initialization and said in-circuit-emulator further comprises:

a SFTRST bit which is adapted to cause the microprocessor to halt execution during said emulation mode and forces the microprocessor to enter said interrogation mode during software initialization.

4. A microprocessor with an in-circuit-emulator having an interrogation mode and an emulation mode, wherein said microprocessor outputs a plurality of trace messages over an in-circuit emulator bus, said in-circuit-emulator comprising::

an address mark counter loaded to an initial value upon the occurrence of a first predetermined condition, wherein said address mark counter is updated every clock cycle of said microprocessor, provided that a second predetermined condition does not occur;

an address mark generator coupled to said address mark counter which automatically issues an address mark trace message upon said address mark counter reaching a predetermined state.

5. The microprocessor defined by claim 4 wherein said in-circuit-emulator further comprises:

an AMCTRL bit which is adapted to inhibit said address mark generator from issuing said address mark trace message even upon said address mark counter reaching said predetermined state.

6. A microprocessor with an in-circuit-emulator having an interrogation mode and an emulation mode, said microprocessor for coupling to a host emulator, wherein said microprocessor outputs a plurality of trace messages over an in-circuit emulator bus, said in-circuit-emulator further comprising:

a $\overline{\text{MSGFRM}}$ signal which indicates to the host emulator that a first byte of said trace message has been issued to the in-circuit emulator bus.

7. In a microprocessor with an in-circuit-emulator having an interrogation mode and an emulation mode, wherein said microprocessor outputs a plurality of trace messages over an in-circuit emulator bus, a method for controlling the operation of said in-circuit-emulator comprising the steps of:

asserting an $\overline{\text{ICEBRK}}$ pin for a predetermined minimum period of time causing the microprocessor to immediately cease executing new instructions when the microprocessor transitions from said emulation mode to said interrogation mode.

8. In a microprocessor with an in-circuit-emulator having an interrogation mode and an emulation mode, wherein said microprocessor outputs a plurality of trace messages over an in-circuit emulator bus, said in-circuit-emulator supporting a plurality of initialization modes and a plurality of control registers, a method for controlling the operation of said in-circuit-emulator comprising the steps of:

asserting an $\overline{\text{ICELOCK}}$ pin during said initialization mode, clearing a first set of control registers in said in-circuit-emulator during initialization, protecting from being overwritten a second set of control registers when the in-circuit-emulator is engaged in said initialization mode configuring the microprocessor for operation in said emulation mode.

9. The method defined by claim 8 where said initialization is a software initialization and said method further comprises the steps of:

using a SFTRST bit to cause the microprocessor to halt execution during said emulation mode;

forcing the microprocessor to enter said interrogation mode during software initialization.

10. In a microprocessor with an in-circuit-emulator having an interrogation mode and an emulation mode, wherein said microprocessor outputs a plurality of trace messages over an in-circuit emulator bus, a method for controlling the operation of said in-circuit-emulator comprising the steps of:

loading an address mark counter with an initial value upon the occurrence of a first predetermined condition, updating said address mark counter every clock cycle of said microprocessor, provided that a second predetermined condition does not occur;

automatically issuing an address mark with an address mark trace message upon said address mark counter reaching a predetermined state.

11. The method defined by claim 10 further comprising the steps of:

using an AMCTRL bit to inhibit said address mark generator from issuing said address mark trace message even upon said address mark counter reaching said predetermined state.

12. In a microprocessor with an in-circuit-emulator having an interrogation mode and an emulation mode, said microprocessor for coupling to a host emulator, wherein said microprocessor outputs a plurality of trace messages over an in-circuit emulator bus, a method for controlling the operation of said in-circuit-emulator further comprising the steps of:

generating a $\overline{\text{MSGFRM}}$ signal to indicate to the host emulator that a first byte of said trace message has been issued to the in-circuit emulator bus.

* * * * *